United States Patent Office 3,063,694
Patented Nov. 13, 1962

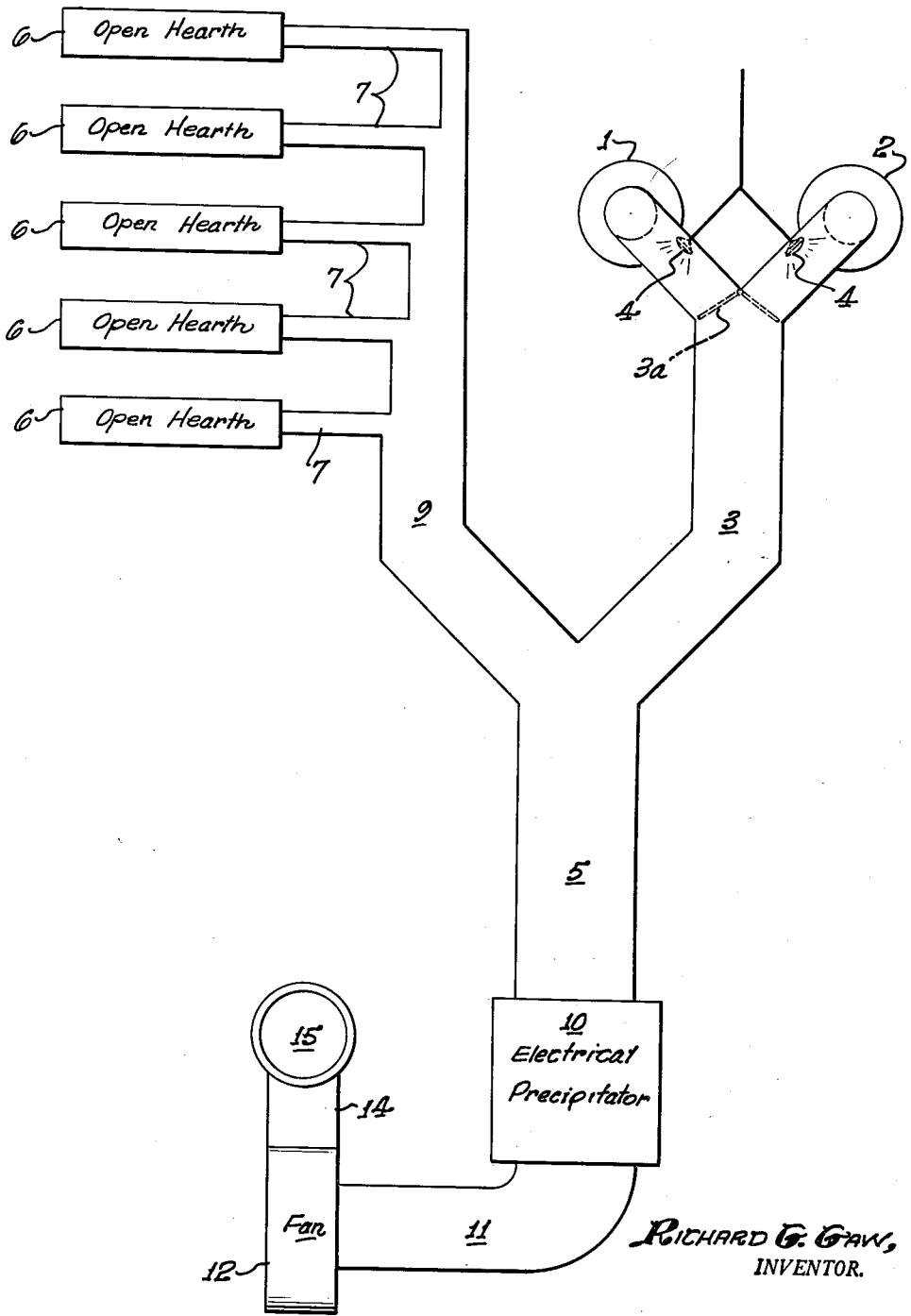

3,063,694
APPARATUS FOR CLEANING GASES FROM FERROUS METALLURGICAL OPERATIONS
Richard G. Gaw, Pittsburgh, Pa., assignor, by mesne assignments, to Joy Manufacturing Company, a corporation of Pennsylvania
Filed Aug. 4, 1959, Ser. No. 831,597
3 Claims. (Cl. 266—15)

The present invention relates generally to the field of gas cleaning; and more especially to the problem of cleaning gases derived from oxygen converter vessels and other equipment in which steel is made.

At the present time, oxygen converters are rapidly coming into use as an economical means for producing steel. Ferrous metallurgical operations have been carried out in a wide variety of processes and equipment, including open hearth furnaces, electric furnaces, and other well known equipment; but the problems encountered in cleaning gases from oxygen converters are considerably different from those encountered in cleaning gases from other types of equipment used in making steel.

One of the problems is the wide fluctuation in the flow of gases discharged by an oxygen converter. The discharge fluctuates from zero to a high maximum value which is maintained for a relatively short time when the converter is being blown with oxygen. The interval between blows is subject to considerable variation in length but it amounts to as much as ⅓ to ½ of a complete cycle of operations.

The gases discharged from an oxygen converter are very hot and have a relatively high dust loading under peak conditions. Although the average dust loading during a blow may be only about one-half of peak or maximum loading, the average loading is still high by comparison with other equipment for similar ferrous metallurgical processes.

While gases of this type are suitable for cleaning by passing them through an electrical precipitator, the aforementioned characteristics of the gases discharged from an oxygen converter are, generally speaking, unfavorable from the standpoint of obtaining necessary high cleaning efficiency at minimum cost with an electrical precipitator. For example, an electrical precipitator operates at maximum collection efficiency only within a relatively narrow range of flow rates through the precipitator and collection efficiency can decrease rather rapidly if flow rates exceed, by a relatively small amount, the designed capacity of the unit. Furthermore, the precipitator is designed for continuous operation and is most efficient and economical under uniform conditions. Consequently, the wide fluctuations in flow rate of gases discharged by an oxygen converter, coupled with very heavy peak duct loadings, make it uneconomical to design electrical precipitators which are able to operate with high collection efficiency required over such a wide range of conditions. The electrical precipitator gives its most satisfactory operation when the rates of gas flow are relatively constant, the dust loadings are relatively constant, and certain other conditions, such as temperature and humidity, are within favorable limits.

Thus it is a general object of my invention to provide an improved method for cleaning gases from oxygen converters producing steel, in order to obtain high collection efficiencies with a minimum amount of gas cleaning equipment.

It is also an object of my invention to improve the characteristics of gas discharged from an oxygen converter to produce gases which lend themselves more readily to efficient cleaning by an electrical precipitator.

A further but important object of my invention is to make the most effective use of an electrical precipitator in cleaning gases from an oxygen converter in order to minimize the capital investment required to clean a given volume of said gases.

These and other objects of my invention have been attained by first cooling the stream of gases received from the oxygen converter by evaporating water therein and then mixing the cooled and humidified gases with gases which have been discharged from an open hearth furnace in which ferrous metallurgical operations are being carried on to produce steel. The combined or mixed gases are then passed through an electrical precipitator to collect the particles suspended in the gases, the precipitator operating under more favorable conditions because of the improved characteristics of the combined gas stream.

In order to carry out my improved method, I provide a mixing chamber which is connected by suitable duct means to both an oxygen converter and to one or more open hearth furnaces in order that gases from both of these items of process equipment are delivered to a mixing chamber wherein the gases are mixed to produce a substantially uniform gas stream. It is preferable to provide means for introducing water into the gas stream delivered by the oxygen converter before it reaches the mixing chamber in order to evaporate into these gases the added water and thereby reduce the extremely high temperature of the converter gases. The outlet of the mixing chamber is connected either by a suitable duct or directly to the inlet of the electrical precipitator through which the combined gas stream is passed in order to remove from it the suspended particles.

How the above objects and advantages of my invention, as well as others not specifically referred to herein, are attained, will be more readily understood by referring to the following description and to the annexed drawing in which the single FIGURE is a diagram illustrating gas flow through the equipment carrying out my improved method.

Referring to the drawing, by way of example, I show an arrangement including two oxygen converters 1 and 2 both connected to gas duct 3. This is typical of an installation in which only one converter is normally in operation at a time, the two of them being provided primarily in order to have continuity of operation. After a period of service, perhaps a few weeks, it is necessary for a converter to be rebricked for replacement of the refractory lining which is consumed in the metallurgical process. Providing two converters permits one to be always available for use even when the other one is down for repairs or is on a stand-by basis.

Duct 3 is provided with sprays 4 or other means of introducing water into the hot gas stream. A damper 3a may be used to shut off the converter not in use.

A plurality of open hearth furnaces 6 are shown, each connected by a branch duct 7 to a common duct 9. Five furnaces are shown as an example, but the number may be more or less. Ducts 3 and 9 join to discharge gas streams from the converter and the furnaces respectively into a mixing chamber 5. The outlet of the mixing chamber 5 is connected to the inlet of electrical precipitator 10.

The electrical precipitator 10 may be of any suitable design and of adequate size to give the desired degree of cleaning. The outlet from the precipitator is connected by duct 11 to fan 12 which provides sufficient draft within the entire system to draw the gases from their source through the duct work and the electrical precipitator to the fan. The outlet of the fan is connected by duct 14 to stack 15 through which the cleaned gases are discharged to the open atmosphere.

In operation, the oxygen converter has a blow period of about 22 minutes, more or less, depending upon many factors, such as the size of the unit, the amount of oxygen used, the exact nature of the refining process, and other factors. After each blow period, there is an interval of perhaps 12 to 24 minutes during which the converter is not discharging any gases, this interval including discharge of refined metal and the loading period during which the next charge is placed in the converter. At the beginning of each blow, the gas volume discharged from the converter rises very rapidly to near the maximum, remaining at or near the maximum for most of the blow period, and then dropping off rapidly to nearly zero after the blow period is completed.

The flame temperature in the converter is of the order of 3000°–3600° F. The gases leaving the converter and entering the hood which is the inlet to duct 3 are typically cooled by introduction of atmospheric air to a temperature range of 1400°–2000° F. The resultant large volume of gas can be reduced by further cooling the gases and consequently some means, such as sprays 4, are provided near the inlet end of duct 3 in order to introduce water into the gas stream to cool the gases and also to humidify them. The amount of water added is controlled to reduce the temperature to approximately 500° F. or slightly below. In a typical situation, the amount of water introduced is sufficient that approximately 20–30% by volume of the gases is water vapor. This spray cooling is activated only during the blow period and perhaps for something less than the full duration of the blow period.

The rate of gas emission from the oxygen converter depends of course upon the size of the unit as well as other factors; but only as an example, a typical unit of approximately 100 ton capacity emits gases at a maximum rate such that the gas flow in duct 3 after cooling by sprays 4 is approximately 185,000 c.f.m. (cubic feet per minute) measured at standard conditions or 305,000 c.f.m. at 400° F. which is a normal operating temperature for such gases This peak flow is maintained for most of the blow period. Throughout the blow period, the average dust loading of the converter gases emitted may be in the neighborhood of 5–7 grains per cubic foot under standard conditions. However, the maximum dust loading may reach values in the range of 10–13 grains per cubic foot under standard conditions for a portion of the blow period.

Thus it will be seen that the oxygen converter emits a large volume of very hot gas at a high rate during each blow period but during the interval between successive blow periods, there is no gas emission. This interval may constitute from 25 to 50% of a complete cycle of operations and represents a time during which no gas is supplied by a converter to the electrical precipitator. These gases have a very high dust loading reaching the maximum value for a few minutes during each cycle, the maximum perhaps being of the general order of 10 to 15% of the length of a complete cycle. These conditions are all very unfavorable to optimum operation of an electrical precipitator since the precipitator size must be such that it can handle the maximum dust loading and maximum gas flow at the required collection efficiency, which may be as high as 99% or more. These conditions actually exist for only perhaps 10 to 15% of the time. For the remainder of each cycle of operation, a precipitator sized to meet these maximum operating requirements would be far in excess of the size otherwise required and would actually be operating under uneconomical conditions for the majority of the operating cycle.

I have been able to reduce the disadvantages thus far described by supplying to the same electrical precipitator additional gas from a compatible source. This is preferably gas discharged from ferrous metallurgical operations such as are carried on in open hearth furnaces which are located in the vicinity of the oxygen converters. A plurality of open hearth furnaces may be connected to a common duct 9. As an example, but without limitation thereto, I show an installation of such furnaces; but it is frequently the case that not all of them are operating at one time since one of them may be down for repairs, rebricking, or other reasons. The gas discharged from the open hearth furnaces is combined with the gas discharged from the oxygen converter by bringing the gas streams together in mixing chamber 5. This need not be a special chamber but may in fact be a length of common duct which discharges to the inlet side of electrical precipitator 10. The open hearth furnaces are chosen as a source of added gas because of the favorable characteristics of the gas discharged from them.

The gases are discharged from an open hearth furnace at a somewhat variable rate but one which is relatively uniform when compared with the oxygen converter. Assuming an open hearth furnace that may discharge gas at the maximum rate of approximately 50,000 c.f.m., at standard conditions the probable range of gas emission would be about 33,000–50,000 c.f.m. at standard conditions. These represent maximum and minimum flows; and it will be understood that the gas discharge is continuous since while operating there is no time during which the gas discharge ceases. Assuming that all the furnaces are in operation, the maximum emission would be in the neighborhood of 250,000 c.f.m. at standard conditions or 487,000 c.f.m. at 550° F. which is a normal discharge temperature for such gases although this would assume that all five furnaces are operating at the same phase of the process. Allowing for a normal difference in operating phases, the average maximum gas emission from the furnaces may be expected to be in the vicinity of 420,000 c.f.m. at 550° F.

While the absolute limits of combined gas flow from the open hearths and converters based on the above figures extend over the range from about 420,000 c.f.m. to about 792,000 c.f.m. from 550° to 500° F. it will be unlikely that, in practice, maximum or minimum conditions occur in all units at the same time. Based on a percentage value, this range is roughly between 50% and 100% of maximum, as compared with 0 to 100% in the case of the converter gases alone. There is now no period at which little or no gas is flowing through the system to the electrical precipitator. Consequently by designing the electrical precipitator for a normal operating load in the vicinity of 740,000 c.f.m. at operating conditions, it can care for temporary fluctuations up to 792,000 c.f.m. but it is always operating to clean some gas and on the whole is never handling a gas volume below about ½ its normal designed capacity.

A similar improvement in the operating conditions from the standpoint of dust loading is possible as the result of combining the gas streams from the open hearth furnaces with the oxygen converter. If it is assumed that the peak dust loading of gas from the oxygen converter is 10 grains per cubic foot and that the average dust loading of gas from the open hearth furnaces is 2 grains per cubic foot, then in the case of the assumed gas flows during the period the converter is discharging the maximum dust loading in the combined gases drops to approximately 6.2 grains per cubic foot with an average value of about 5.7 grains per cubic foot. It is widely recognized that an electrical precipitator of specific size is more effective in cleaning gas to a given outlet dust loading when the inlet dust loading is relatively light so that by combining the gases from the open hearth furnaces with those from the oxygen converter, the dust loading of the combined gas stream is much more favorable for economic sizing of the electrical precipitator than is the dust loading of the converter gases alone. Of course the exact values depend upon the volume of gas flow through the precipitator at any given instant.

The more favorable operating conditions are reflected not only in a higher collection efficiency for a precipitator of a given size, but they enable the size of the precipitator for the combined gas stream to be somewhat smaller than would be required for separate treatment of the gases from the open hearth furnaces and from the oxygen converter. Also, by combining the gases from the several sources into a single stream, other economies are effected since a unit volume of gas can be treated more economically in a large precipitator than in a small one. As a result, the capital investment involved in a precipitator adequate to treat the combined gases is reduced by 10% or more over the total investment required to provide separate precipitators for treatment of the separate gas streams.

A further advantage derived from combining the gas streams from the open hearth furnaces and the oxygen converter is the more favorable humidity condition existing in the combined gas streams. Humidity from the open hearth is fairly constant in the range of 8–10% by volume. On the other hand, the gases from the oxygen converter, must have moisture added to achieve optimum precipitation. As much as 20–30% by volume of moisture can be added during a part of the blow. However, for the remaining time of each blow, the converter gas is dry; and effective treatment of the dry gas in an electrical precipitator is quite difficult. Since these dry gases are humidified by mixture with the open hearth gases, a highly unfavorable condition is minimized at any time for the converter gases. Furthermore, the relatively high periodic humidity of the converter gases is reduced by mixing them with the less humid open hearth gases so that under conditions of maximum humidity, humidity is not as high in the combined gases as with the converter gases alone. This reduction in the fluctuation of these conditions reduces operating problems and is of great assistance in obtaining more uniform and efficient operation of the electrical precipitator.

From the foregong description, it will be obvious that various changes in the arrangement of the component parts of the system as well as in exact details of the steps involved may be made without departing from the spirit and scope of my invention. Accordingly, I wish it to be understood that the foregoing is considered to be illustrative of, rather than limitative upon, the invention as defined by the appended claims.

I claim:
1. Dust collecting equipment in combination with at least one oxygen converter and at least one open hearth furnace each discharging particle laden gases from ferrous metallurgical operations, comprising: a mixing chamber; duct means connecting the mixing chamber to at least one oxygen converter and to at least one open hearth furnace, respectively, to deliver exhaust gases from both to the mixing chamber; and an electrical precipitator connected to the mixing chamber to receive mixed gases therefrom.

2. Dust collecting equipment as in claim 1 which also includes means for introducing water into the gas stream from said at least one oxygen converter before reaching the mixing chamber.

3. Dust collecting equipment comprising in combination: at least one oxygen converter producing dust laden gases from refining ferrous metals; at least one open hearth furnace producing dust laden gases from refining ferrous metals; a mixing chamber having an inlet and an outlet; a first gas duct connecting said at least one oxygen converter to said inlet of the mixing chamber; a second gas duct connecting said at least one open hearth furnace to said inlet of the mixing chamber; and an electrical precipitator having an inlet connected to said outlet of said mixing chamber wherein dust is removed from the mixed gases exiting from said mixing chamber.

References Cited in the file of this patent
UNITED STATES PATENTS

| | | |
|---|---|---|
| 698,610 | Wills | Apr. 29, 1902 |
| 889,694 | Lambert | June 2, 1908 |
| 2,667,941 | Ekstrom | Feb. 2, 1954 |
| 2,723,842 | Hall | Nov. 15, 1955 |
| 2,799,492 | Hobenreich et al. | July 16, 1957 |
| 2,862,701 | McFeaters | Dec. 2, 1958 |

FOREIGN PATENTS

| | | |
|---|---|---|
| 524,829 | Italy | Apr. 30, 1955 |